United States Patent [19]

Stockwell

[11] Patent Number: 4,912,924
[45] Date of Patent: Apr. 3, 1990

[54] ROTARY INTERNAL COMBUSTION ENGINE AND POWER PLANT

[76] Inventor: James K. Stockwell, 6040 S.W. 9th St., Plantation, Fla. 33317

[21] Appl. No.: 251,340

[22] Filed: Sep. 30, 1988

[51] Int. Cl.$^4$ .............................................. F02C 3/16
[52] U.S. Cl. ................................ 60/39.45; 60/39.75; 60/39.78; 415/75
[58] Field of Search ............ 60/39.34, 39.45 R, 39.75, 60/39.76, 39.78; 415/75

[56] References Cited

U.S. PATENT DOCUMENTS

| | | | |
|---|---|---|---|
| 756,210 | 4/1904 | Butler | 415/75 |
| 2,400,899 | 5/1946 | Wilcox | 60/39.75 |
| 2,436,246 | 2/1948 | Braga | 415/75 |
| 2,962,008 | 11/1960 | Hopkins | 123/45 |
| 3,175,359 | 3/1965 | Szlechter | 60/39.45 R |
| 3,556,670 | 1/1971 | Tucker | 415/75 |
| 3,693,601 | 9/1972 | Sauder | 60/39.45 R |
| 4,222,231 | 9/1980 | Linn | 60/39.45 R |

FOREIGN PATENT DOCUMENTS 917953  1/1947  France .......................... 60/37.45 R

*Primary Examiner*—Louis J. Casaregola
*Attorney, Agent, or Firm*—Oltman and Flynn

[57] ABSTRACT

A rotary internal combustion engine and a power plant having at least one such engine. The engine has a generally cylindrical rotor with one or more helical grooves on the outside rotatably mounted in a cylinder, means for introducing a combustible fuel-air mixture into the cylinder at one end, a spark plug for firing the fuel mixture, and means for venting the products of combustion from the opposite end of the cylinder. A main air compressor driven by the engine supplies pressurized air as part of the combustible fuel-air mixture. The rotor has an axial passage connected to an auxiliary air compressor and radial passages extending out from the axial passage to the periphery of the rotor for providing a cushion of air between the rotor and the inside of the cylinder which acts as a bearing and also has a cooling effect. An outer housing encloses the engine cylinder and cooling air is introduced into the space between this housing and the cylinder from another air compressor driven by the engine.

14 Claims, 6 Drawing Sheets

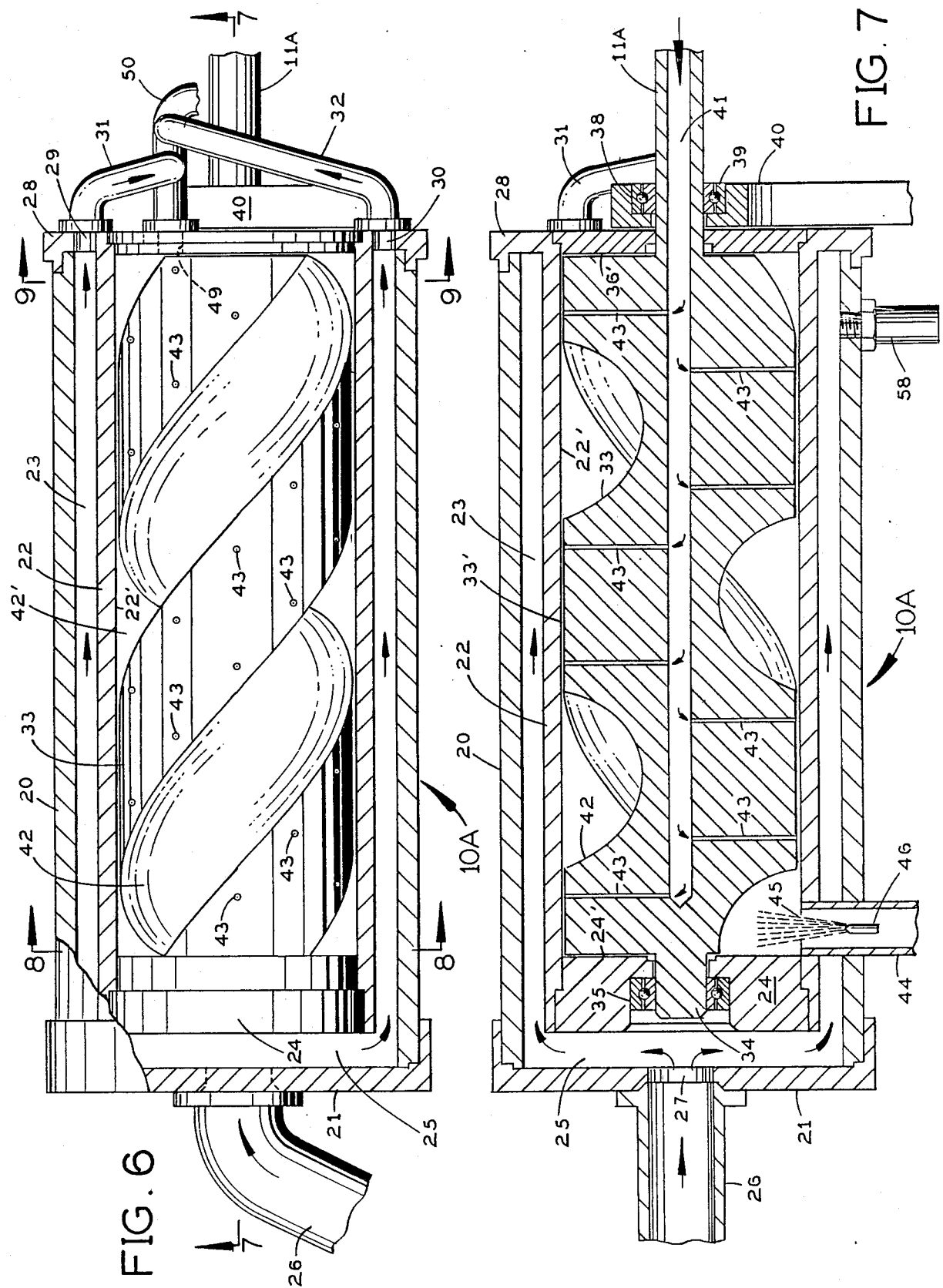

ROTARY INTERNAL COMBUSTION ENGINE AND POWER PLANT

SUMMARY OF THE INVENTION

This invention relates to a rotary internal combustion engine and to a power plant having one or more such engines.

The engine of the present invention has a spirally-grooved, generally cylindrical rotor running inside a cylinder. A combustible mixture of fuel and pressurized air is introduced into the cylinder, preferably at one end, and is fired in a spiral groove in the rotor. The products of combustion are passed from that groove, preferably at the opposite end of the cylinder. The rotor has internal passages which open onto its periphery for passing pressurized air between the periphery of the rotor and the inside of the cylinder to provide an air cushion between them and cool the engine. Preferably, these internal passages include an axial passage in the rotor where the pressurized air is introduced. Preferably, the engine has an outer housing surrounding the cylinder and forming with it a space around the cylinder for receiving pressurized air to cool the cylinder on the outside.

The power plant of the present invention comprises at least one such engine and one or more sources of pressurized air. In the presently preferred embodiment, the power plant has two such engines driving a single output shaft, an air storage tank connected to supply pressurized air to the internal passages in the rotor of each engine and connectable to provide pressurized air to each cylinder for the fuel-air mixture therein for starting the engine, a main air compressor driven by the output shaft and connected to supply pressurized air to each cylinder for the fuel-air mixture after the engines have started running, an auxiliary air compressor driven from the output shaft and supplying pressurized air to the air storage tank, and a cooling air compressor driven by the output shaft and connected to supply air to the space around each engine cylinder inside the outer housing of that engine.

A principal object of this invention is to provide a novel rotary internal combustion engine.

Another object of this invention is to provide a novel power plant having one or more such engines.

Further objects and advantages of this invention will be apparent from the following detailed description of a presently preferred embodiment which is illustrated schematically in the accompanying drawings.

DESCRIPTION OF THE DRAWINGS

FIG. 6 is a horizontal longitudinal section through one of the two identical internal combustion engines in this power plant;

FIG. 7 is a vertical longitudinal section through this engine, taken along the line 7—7 in FIG. 6;

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
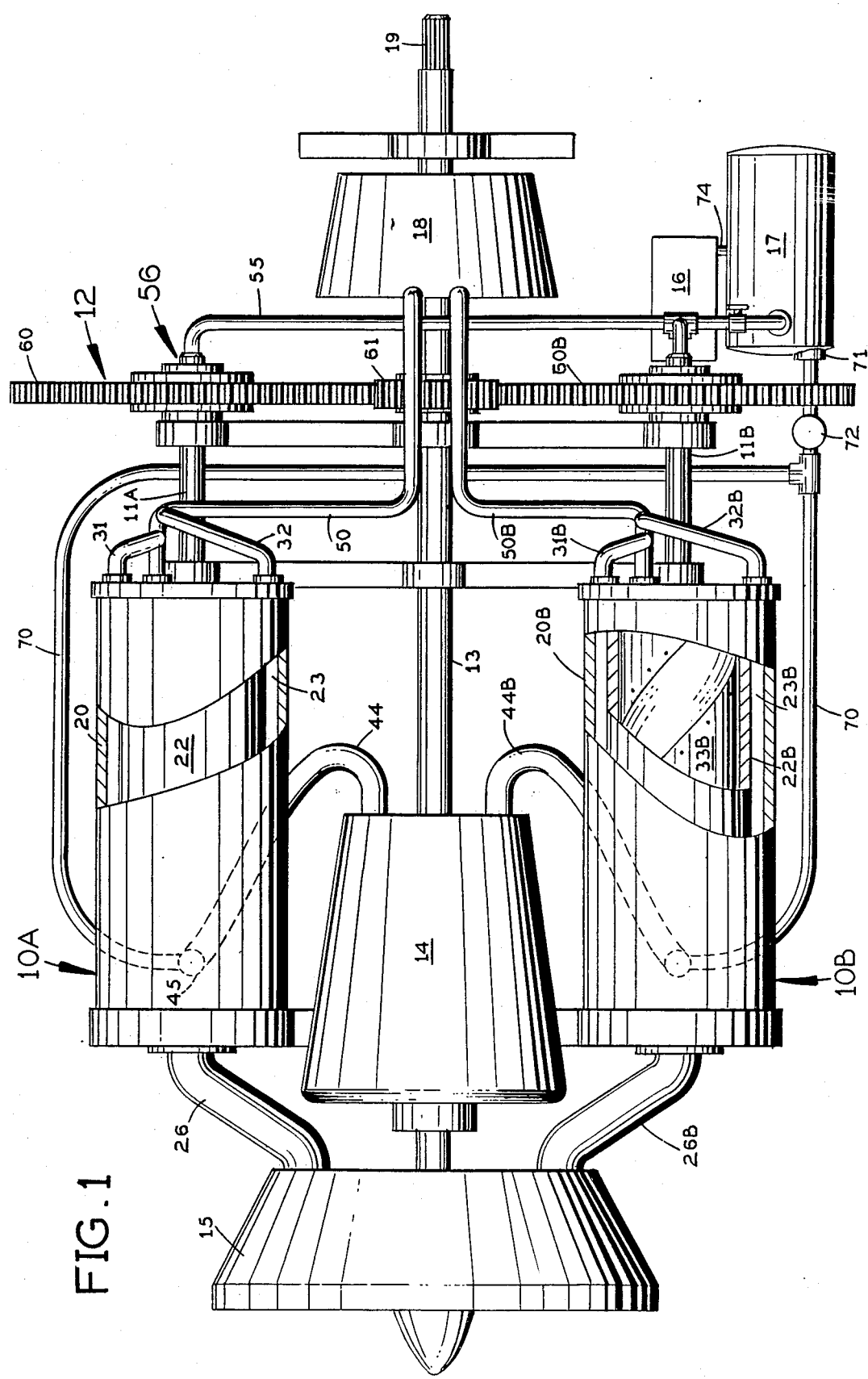
FIG. 1 is the top plan view of a power plant in accordance with the present invention and having two internal combustion engines in accordance with this invention, with certain parts broken open for clarity.

In broad outline, the illustrated embodiment of the present invention comprises (FIG. 1);

a pair of rotary internal combustion engines 10A and 10B;

respective rotary engine shafts 11A and 11B driven by engines 10A and 10B;

output gearing 12 driven by the engine shafts;

an output shaft 13 driven by the output gearing;

a main air compressor 14 with a rotor connected to output shaft 13;

a first cooling air compressor 15 with a rotor connected to output shaft 13 at one end of the latter;

a second cooling air compressor 16 driven by the output gearing 12;

an air storage tank 17;

an exhaust turbine 18 with a rotor connected to output shaft 13;

and a power takeoff 19 on the opposite end of output shaft 13 from compressor 15.

The two engines 10A and 10B are identical. Engine 10A will be described in detail with reference to FIGS. 6 and 7. This engine has a cylindrical outer housing 20 with an end plate 21 on its end (the left end in FIG. 6) toward the first cooling air compressor 15 shown in FIG. 1. An engine cylinder 22 extends concentrically inside the housing 20 with an annular air space 23 between them. Cylinder 22 has an annular end plate 24 on its left end in FIG. 6 which is spaced axially from the housing end plate 21 so that an air space 25 is formed between them which communicates with the annular air space 23 around the outside of engine cylinder 22. An air duct 26 extends from the outlet side of the first cooling air compressor 15 to the housing end wall 21, which has an opening 27 (FIG. 7) for passing cooling air from this compressor into the air spaces 25 and 23 between the engine cylinder 22 and housing 20. At the opposite end of this engine, the engine cylinder 22 has an outwardly projecting, annular, flanged, transverse end segment 28 which is attached to the adjacent end of outer housing 20 in an air-tight fashion. This end segment 28 has a pair of openings 29 and 30 for passing air from the annular space 23 between housing 20 and engine cylinder 22 to respective outlet ducts 31 and 32.

Engine cylinder 22 rotatably receives a rotor 33 which has a stub shaft 34 on its left end in FIG. 7 that is rotatably supported by a ball bearing 35 in the end plate 24 on engine cylinder 22. The opposite end of engine cylinder 22 has an annular end plate 36. As shown in FIG. 7, the engine rotor 33 has its output shaft 11A extending rotatably through a central opening 38 in end plate 36. A ball bearing 39 positioned outside this end plate rotatably supports shaft 11A. Ball bearing 39 is mounted in a flanged support ring 40. Shaft 11A and the engine rotor 33 have a continuous axial passage 41.

Figures 8, 9:
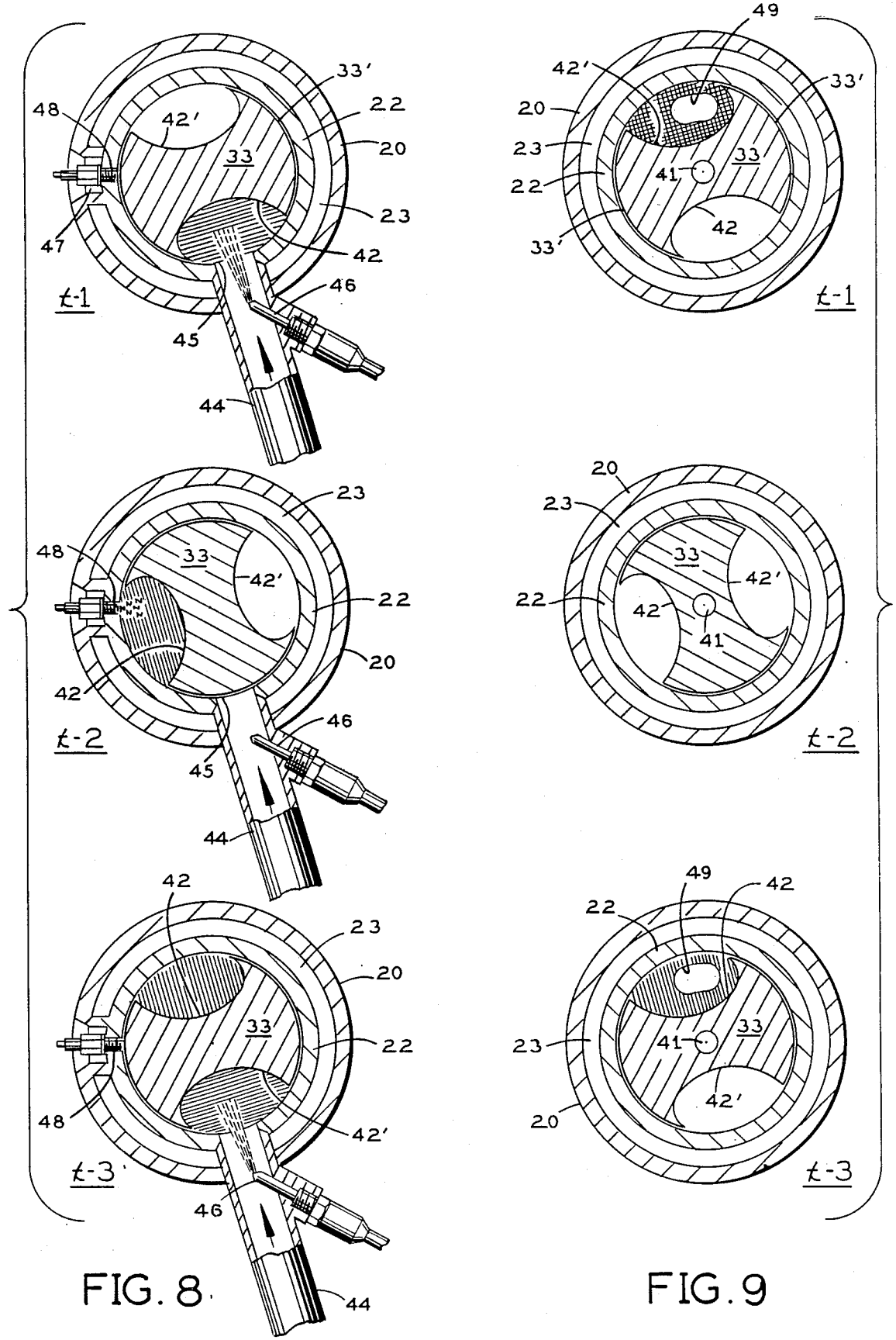
FIG. 8 is a cross-section taken along the line 8—8 in FIG. 6 at one end of the engine rotor at different times, t-1, t-2 and t-3, during its rotation.
FIG. 9 is a cross-section taken along the line 9—9 in FIG. 6 at the opposite end of the engine rotor at the same times as in FIG. 8.

The rotor 33 is a generally cylindrical body formed with two relatively wide helical grooves or passageways 42 and 42' in its periphery. At any location along the length of the rotor, its two peripheral grooves 42 and 42' are 180 degrees apart circumferentially, as shown in FIGS. 8 and 9. Between the successive turns of these grooves the rotor has peripheral lobes 33' which are helically extending segments of a cylinder that is just slightly smaller than the inside of engine cylinder 22. The rotor has small diameter radial passages 43 which extend out from its axial passage 41 to its peripheral lobes 33', which have a slight clearance from the cylindrical inside surface 22' of engine cylinder 22. At one axial end (the left end in FIGS. 6 and 7), the engine rotor 33 has a slight clearance from the inside face 24' of the end plate 24 of engine cylinder 22. At its opposite axial end, the engine rotor has a slight clearance from the inside face 36' of the end plate 36 of the engine cylinder.

As shown in FIG. 7, a tube or conduit 44 extends through the outer housing 20 and the engine cylinder 22 just inside the engine cylinder's end plate 24. This tube terminates in an opening 45 which opens into either spiral groove 42 or 42' in the engine rotor 33, as shown in this Figure, or into the clearance between a helical peripheral lobe 33' on the rotor and the inside surface 22' of engine cylinder 22, depending upon the rotational position of the engine rotor, as shown in FIG. 8. A fuel injector 46 of known design extends into the tube 44 near the opening 45 for discharging fuel into the spiral groove 42 or 42' in the engine rotor at appropriate times during each rotation of the engine rotor. As shown in FIG. 1, the opposite end of tube 44 is connected to the outlet side of main air compressor 14. Thus, compressed air is discharged through the opening 45 into the engine cylinder 22 along with fuel from the fuel injector 46 to provide a combustible fuel-air mixture.

As shown in FIG. 8, at this end the engine cylinder 22 has an opening 47 which is spaced circumferentially from the opening 45 where fuel and air are introduced into the engine cylinder. A spark plug 48 is located in opening 47. As shown, the axis of opening 47 is several degrees more than 90 degrees from the axis of opening 45 in the direction of rotation of the engine rotor 33 (clockwise in FIG. 8).

At the opposite end of the engine cylinder (FIGS. 6 and 9) its end plate 36 has an opening 49 leading to an exhaust pipe 50. The air outlet ducts 31 and 32 from the annular space 23 between housing 20 and engine cylinder 22 also are connected to exhaust pipe 50.

As shown in FIGS. 8 and 9, at a time t-1 when the spiral groove 42 at one end of the engine rotor 33 is positioned (FIG. 8) to receive fuel from the fuel injector 46 and compressed air from tube 44, the other spiral groove 42' at the opposite end of the engine rotor registers with the opening 49 to pass exhaust gases from the engine to the exhaust pipe 50. At a later time t-2 when the spiral groove 42 in the engine rotor registers with spark plug 48 (FIG. 8) the next lobe 33' of the engine rotor blocks the tube 44 where the fuel injector 46 is located and the opposite end of the engine rotor (FIG. 9) blocks the exhaust opening 49. At a still later time t-3, the second spiral groove 42' in the engine rotor registers with tube 44 (FIG. 8) while at the opposite end of the rotor its first spiral groove 42 registers with the opening 49 leading to exhaust pipe 50.

Fuel injector 46 operates in timed relationship with the rotation of the engine rotor 33 such that it discharges fuel only when a spiral groove 42 or 42' in the rotor registers with the opening 45 at the end of tube 44. This fuel mixes with the compressed air coming from tube 44 to form a combustible fuel-air mixture in that groove of the engine rotor. When that groove in the engine rotor reaches the opening 47 in engine cylinder 22, the spark plug 48 is fired, igniting the fuel-air mixture to produce an explosion that travels along this spiral groove toward the opposite end of the engine cylinder. The products of combustion are vented from this groove on the engine rotor when its opposite end registers with the exhaust opening 49 in the end plate 36 of the engine cylinder there.

Figure 4:
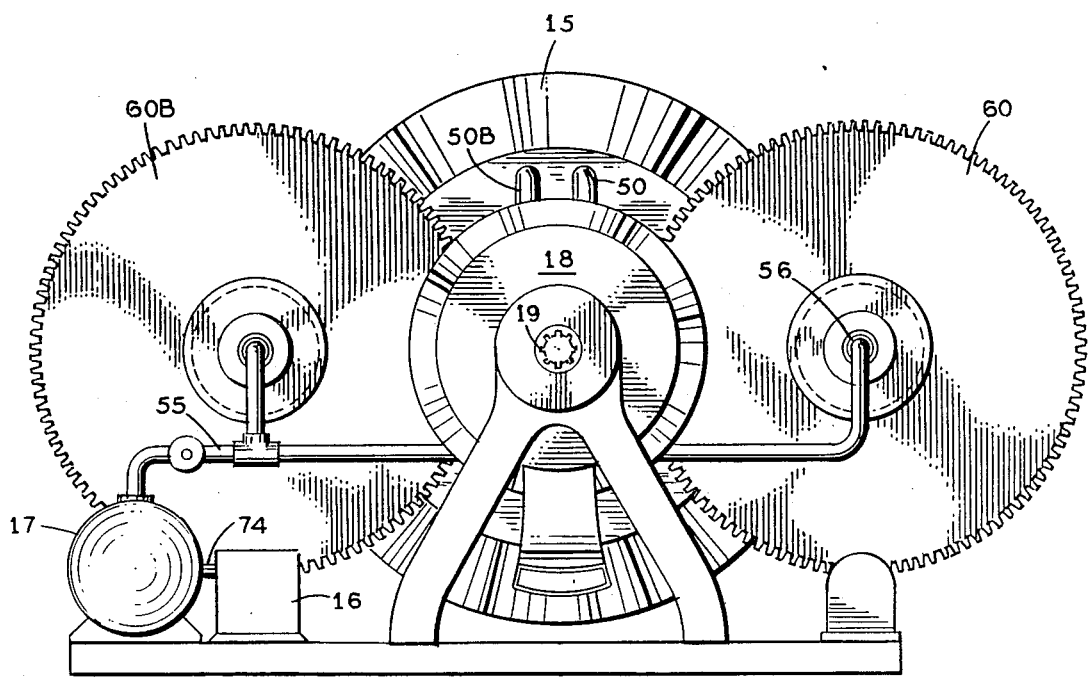
FIG. 4 is an elevation taken from the right end of FIGS. 1 and 2.

As shown in FIGS. 1 and 4, the air tank 17 has an outlet which is connected by a pipe 55 and a rotary coupling at 56 to the axial passage 41 in the engine rotor's output shaft 11A. This air flows out through the radial passages 43 in the engine rotor to provide an air cushion or "bearing" between the lobes 33' of the engine rotor 33 and the inside surface 22' of engine cylinder 22 and to cool the engine on the inside. This air is vented from the engine cylinder through the exhaust opening 49 in its end plate 36 along with the products of combustion.

The engine is cooled on the outside by air from the first cooling air compressor 15, which is delivered through conduit 26 into the end space 25 and the annular space 23 inside the outer housing 20 around the outside of engine cylinder 22. This cooling air is vented from the opposite end of housing 20 through the openings 29 and 31 in the annular end segment 28 of the engine cylinder to the conduits 31 and 32 going to the exhaust pipe 50.

As shown in FIG. 7, a pressure relief valve 58 is mounted on the outer housing 20 of the first engine 10A and is responsive to the air pressure in the annular space 23 to vent excess air pressure to the atmosphere.

As shown in FIG. 1, the exhaust pipe 50 from the first engine 10A goes to the inlet side of the exhaust turbine 18 to cause its rotor to rotate, thus adding to the input torque to shaft 13.

The second internal combustion engine 10B is essentially identical to the first engine 10A and need not be described in detail. Elements of the second engine and the pipes leading to and from it are given the same reference numerals, with a B suffix added, as those of the first engine.

Figure 2:
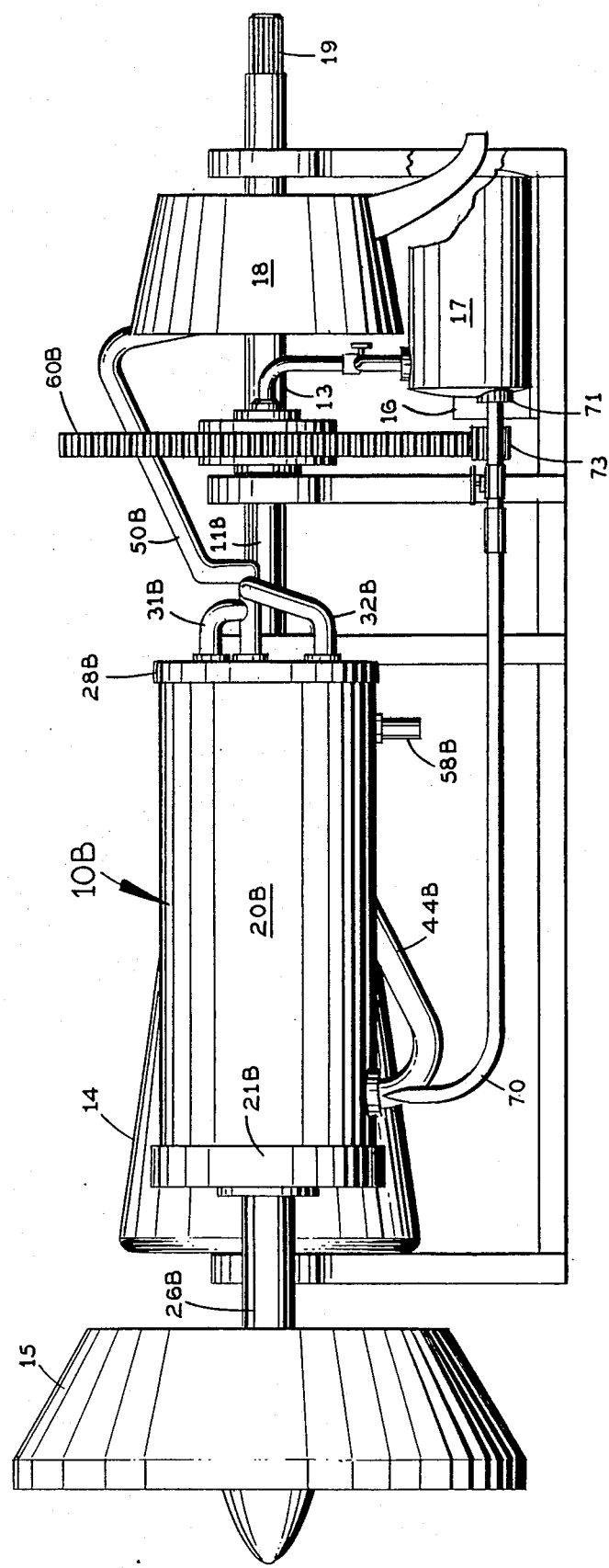
FIG. 2 is a side elevation of the power system shown in FIG. 1.
Figure 3:
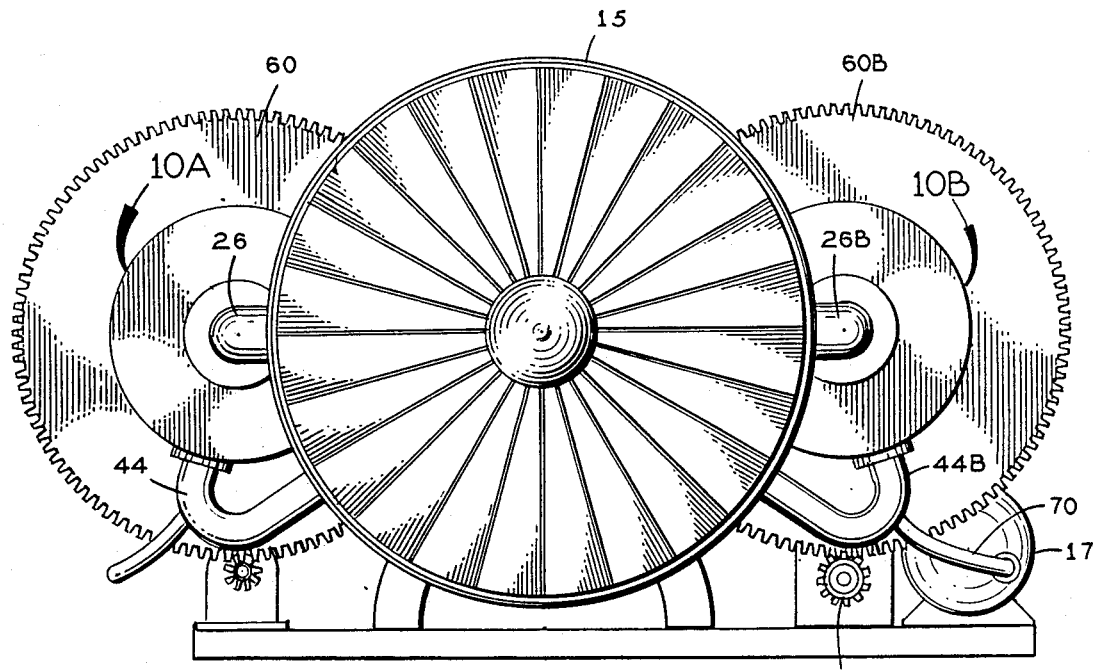
FIG. 3 is an elevation taken from the left end of FIGS. 1 and 2.

The second engine 10B receives cooling air through a conduit 26B coming from the first cooling air compressor 15. The second engine also receives cooling air from tank 17 through the central passage in its output shaft 11B and its rotor 33B. Compressed air is supplied from the main compressor 14 via tube or conduit 44B to the second engine to mix with the fuel. Air and the products of combustion are vented from the second engine via conduits 31B and 32B to an exhaust pipe 50B which goes to the inlet side of the auxiliary turbine 18 to drive it. As shown in FIG. 2, a pressure relief valve 58B is provided on the second engine to relieve excess air pressure from the annular space 23B (FIG. 1) between its outer housing 20B and its engine cylinder 22B.

As shown in FIG. 1, the rotary output shaft 11A of the first engine 10A carries a gear 60 which meshes with a gear 61 on the main shaft 13. Similarly, the output shaft 11B of the second engine 10B carries a gear 60B that meshes with gear 61. Thus, both engines drive the main shaft 13, which is the rotor shaft for the main air compressor 14 and the first cooling air compressor 15. The exhaust gases and air vented from the two engines drive the auxiliary turbine 18 to increase the input torque applied to main shaft 13.

The input air pressure to the two engines is equalized by an air intake manifold 70 (FIG. 1) connected to the pressurized air inlet conduits 44 and 44B of both engines. Manifold 70 is connected to an outlet 71 of air tank 17 through a valve 72.

When the engines 10A and 10B are being started, valve 72 is opened to supply compressed air from tank 17 through the air intake manifold 70 to the air inlet conduits 44 and 44B of both engines 10A and 10B. After the main air compressor 14 has started supplying air at sufficient pressure to the engines, valve 72 may be closed, disconnecting the air tank 17 from the engines.

Figure 5:
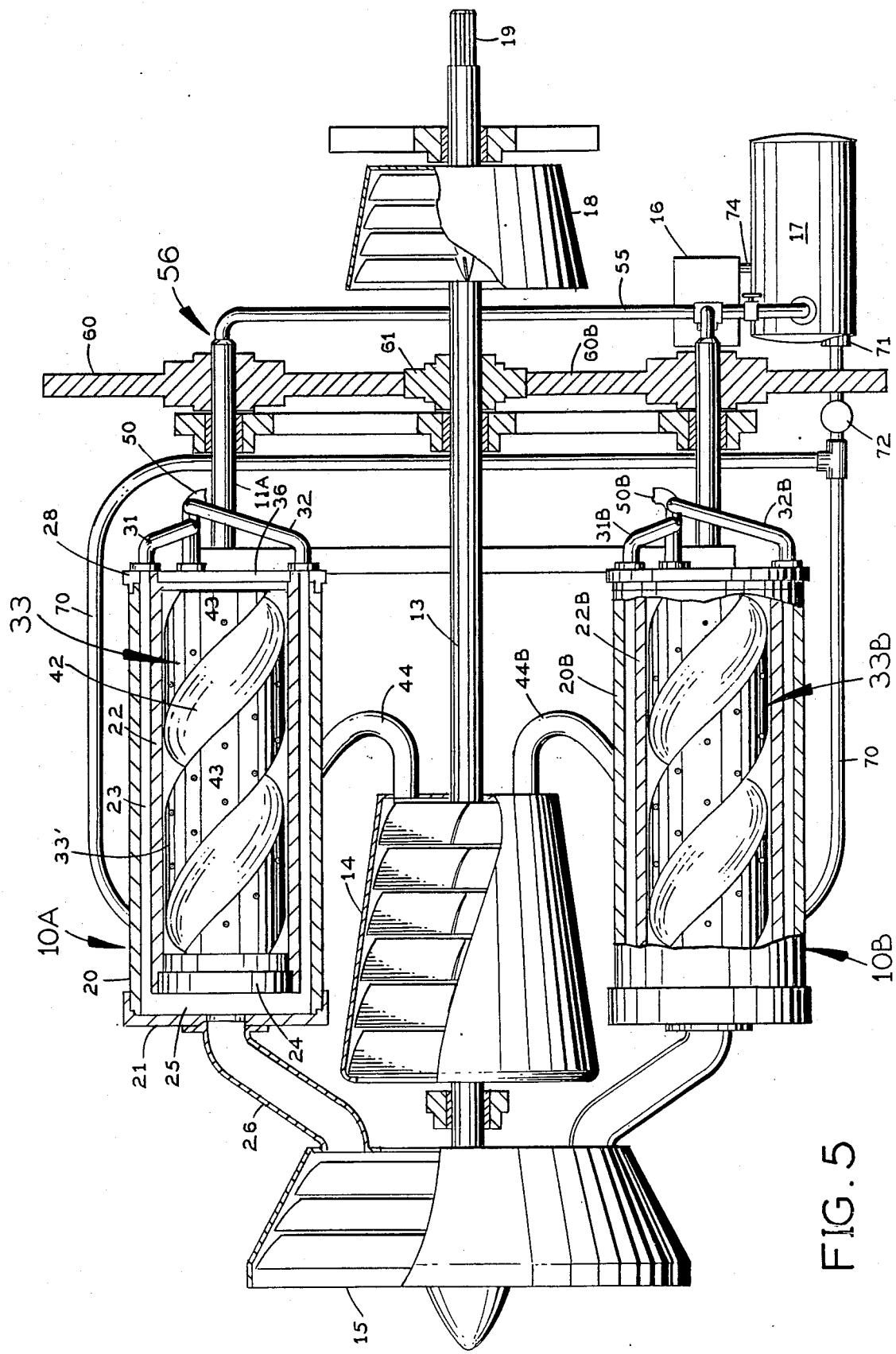
FIG. 5 is a view similar to FIG. 1 with parts broken away to show the inner workings of the power plant and with certain other parts omitted.

As shown in FIG. 2, the gear 60B on the output shaft 11B of the second engine 10B drives a gear 73 coupled to the input shaft of the auxiliary air compressor 16. Thus, compressor 16 begins operating when engine 10B starts. Compressor 16 supplies pressurized air to an inlet 74 to air tank 17 (FIGS. 1, 4 and 5).

From the foregoing description it will be evident that I have provided a novel internal combustion engine in which the fuel combustion directly produces rotation of a rotor, as contrasted with a reciprocating engine where the reciprocation of a piston must be converted to rotation of an output shaft. Also, it will be evident that I have provided a novel power plant having air compressors driven by this engine and connected to it to provide pressurized air for the combustible fuel-air mixture and pressurized air for cooling the engine and providing an air cushion or bearing between the engine cylinder and its rotor.

I claim:

1. An internal combustion engine comprising:
a cylinder;
a rotor rotatable inside said cylinder, said rotor being a generally cylindrical body with two separate spiral grooves in its periphery, said grooves being spaced apart circumferentially of the rotor at every point along its length, said body presenting spiral lobes on its periphery outside said grooves in close proximity to the inside of said cylinder;
means located near one end of the cylinder at a first location circumferentially of the cylinder for introducing a combustible fuel mixture into said cylinder;
means for firing said fuel mixture in said spiral grooves in the rotor to produce rotation of said rotor in said cylinder, said means for firing being located near said one end of the cylinder at a second location spaced circumferentially of the cylinder from said first location;
and means for passing the products of combustion from said cylinder, said means for passing the products of combustion from the cylinder being an opening at the opposite end of the cylinder which is positioned to register with one of said spiral grooves in the rotor when the other of said spiral grooves registers with said means for introducing the fuel mixture into the cylinder.

2. An internal combustion engine comprising:
a cylinder;
a rotor rotatable inside said cylinder, said rotor being a generally cylindrical body with two separate spiral grooves in its periphery, said grooves being spaced apart circumferentially of the rotor at every point along its length, said body presenting spiral lobes on its periphery outside said grooves in close proximity to the inside of said cylinder;
means located near one end of the cylinder at a first location circumferentially of the cylinder for introducing a combustible fuel mixture into said cylinder;
means for firing said fuel mixture in said spiral grooves in the rotor to produce rotation of said rotor in said cylinder, said means for firing being located near said one end of the cylinder at a second location spaced circumferentially of the cylinder from said first location;
means providing an opening at the opposite end of the cylinder for passing the products of combustion from said cylinder, said opening being positioned to register with one of said spiral grooves in the rotor when the other of said spiral grooves registers with said means for introducing the fuel mixture into the cylinder;
said rotor having a longitudinal passage therein and a plurality of transverse passages extending out from said longitudinal passage to the periphery of the rotor outside said spiral grooves therein:
and means for passing pressurized air into said longitudinal passage to flow out through said transverse passages and provide an air cushion between the periphery of the rotor and the inside of said cylinder.

3. An internal combustion engine comprising:
a cylinder;
a rotor rotatable inside said cylinder, said rotor being a generally cylindrical body with spiral groove means extending along its periphery, said body presenting spiral lobes on its periphery outside said groove means in close proximity to the inside of said cylinder;
means for introducing a combustible fuel mixture into said cylinder;
means located near one end of said cylinder for firing said fuel mixture in said spiral groove means on the rotor to produce rotation of said rotor in said cylinder;
means at the opposite end of the cylinder for passing the products of combustion from said cylinder;
said rotor having a longitudinal passage therein and a plurality of transverse passages extending out from said longitudinal passage to the periphery of the rotor outside spiral groove means therein;
and means for passing pressurized air into said longitudinal passage to flow out through said transverse passages and provide an air cushion between the periphery of the rotor and the inside of said cylinder.

4. An internal combustion engine comprising:
a cylinder;
a rotor rotatable inside said cylinder, said rotor being a generally cylindrical body with spiral groove means extending along its periphery, said body presenting spiral lobes on its periphery outside said groove means in close proximity to the inside of said cylinder;

means for introducing a combustible fuel mixture into said cylinder;

means for firing said fuel mixture in said spiral groove means on the rotor to produce rotation of said rotor in said cylinder;

means for passing the products of combustion from said cylinder;

said rotor having a longitudinal passage therein and a plurality of transverse passages extending out from said longitudinal passage to the periphery of the rotor outside said spiral groove means therein;

and means for passing pressurized air into said longitudinal passage to flow out through said transverse passages and provide an air cushion between the periphery of the rotor and the inside of said cylinder.

5. An internal combustion engine comprising:
a cylinder;

a rotor rotatable inside said cylinder, said rotor being a generally cylindrical body with spiral groove means extending along its periphery, said body presenting spiral lobes on its periphery outside said groove means in close proximity to the inside of said cylinder;

means for introducing a combustible fuel mixture into said cylinder;

means for firing said fuel mixture in said spiral groove means on the rotor to produce rotation of said rotor in said cylinder;

means for passing the products of combustion from said cylinder;

said rotor having internal passages therein which open onto the periphery of the rotor outside said sprial groove means therein;

and means for passing pressurized air into said passages in the rotor to provide an air cushion between the periphery of the rotor and the inside of said cylinder.

6. An internal combustion engine comprising:
a cylinder;

a rotor rotatable inside said cylinder, said rotor being a generally cylindrical body with two separate spiral grooves in its periphery, said grooves being spaced apart circumferentially of the rotor at every point along its length, said body prsenting spiral lobes on its periphery outside said grooves in close proximity to the inside of said cylinder;

means for introducing a combustible fuel mixture into said cylinder;

means for firing said fuel mixture in said spiral grooves on the rotor to produce rotation of said rotor in said cylinder;

and means for passing the products of combustion from said cylinder, said means for passing the products of combustion from the cylinder being an opening at the opposite end of the cylinder positioned to register with one of said sprial grooves in the rotor when the other of said spiral grooves registers with said means for introducing the fuel mixture into the cylinder.

7. An internal combustion engine comprising:
a cylinder;

a rotor rotatable inside said cylinder, said rotor being a generally cylindrical body with spiral groove means extending along its periphery, said body presenting spiral lobes on its periphery outside said groove means in close proximity to the inside of said cylinder;

means for introducing a combustible fuel mixture into said cylinder;

means for firing said fuel mixture in said spiral groove means on the rotor to produce rotation of said rotor in said cylinder;

means for passing the products of combustion from said cylinder;

an outer housing surrounding said cylinder and forming therewith a space around said cylinder;

said rotor having internal passages which are open at the periphery of the rotor outside said spiral groove means;

means for providing pressurized air to said cylinder as part of said combustible fuel mixture;

means for providing cooling air (a) to said space around the engine cylinder inside said outer housing to provide air for cooling said cylinder on the outside and (b) to said internal passages in the rotor to provide air for cooling the engine on the inside of said cylinder and for providing a cushion of air between the rotor and the inside of the cylinder;

means for passing air from said space around said cylinder inside said outer housing;

and means for passing air and products of combustion of said engine from inside said cylinder.

8. A power plant according to claim 7 wherein said means for providing pressurized air to said cylinder as part of said combustible fuel mixture comprises an air storage tank.

9. A power plant according to claim 8 and further comprising an air compressor driven from said engine and connected to said air supply tank to deliver pressurized air to said tank.

10. A power plant according to claim 9 wherein said means for providing pressurized air to said cylinder as part of said combustible fuel mixture also comprises a main air compressor driven by said engine and connected to said cylinder.

11. A power plant according to claim 7 wherein said means for providing pressurized air to said cylinder as part of said combustible fuel mixture compreses an air compressor driven by said engine and connected to said cylinder.

12. A power plant according to claim 7 wherein said means for providing cooling air comprises: (a) a cooling air compressor driven by said engine and connected to said space around said cylinder inside said housing, and (b) an air storage tank connected to said internal passages in said rotor.

13. A power plant according to claim 12 and further comprising means for connecting said air storage tank to said cylinder to provide pressurized air as part of said combustible fuel mixture.

14. A power plant according to claim 13 and further comprising an auxiliary air compressor driven from said engine and connected to said air supply tank to deliver pressurized air to said tank.

* * * * *